3,408,214
REMOISTENING ADHESIVE COMPOSITION
Merle J. Mentzer, Mokena, Ill., assignor to Corn Products Company, New York, N.Y., a corporation of Delaware
No Drawing. Filed June 30, 1966, Ser. No. 561,690
15 Claims. (Cl. 106—212)

ABSTRACT OF THE DISCLOSURE

The present invention relates to the preparation of an adhesive composition suitable for use as a remoistening adhesive which adhesive possesses improved open time and improved bond time. The adhesive mixture consists of an ungelatinized, chemically modified starch substantially free of set back, a glycol selected from the group consisting of propylene glycol and polyethylene glycol, and a plasticizer. The components are mixed in water to provide a slurry having a solids content of 30 to 70%; preferably the pH of the mixture is adjusted to between 8 and 12, and the mixture is heated sufficiently to gelatinize the starch to provide a remoistening adhesive ready for application.

---

The present invention relates to the preparation of an adhesive composition suitable for use as a remoistening adhesive which possesses improved open time and improved bond time.

The term "remoistening adhesive composition" as employed herein pertains to an adhesive which is applied to a material such as paper or fabric as a coating and dried. Upon moistening, the adhesive composition rapidly develops tackiness and acts as a binding agent for bonding the coated material to another material. Examples of uses of a remoistening adhesive include gummed labels, gummed tape, and the like.

Certain criteria are used by industry to determine the qualities of a remoistening adhesive composition. Some of these criteria include open time, bond time, blocking characteristics, wet curl, dry curl, gloss, etc. Two of the most important qualities of a remoistening adhesive composition are its bond time and open time.

Bond time is the minimum time necessary to develop a fiber tearing bond after remoistening and applying the adhesive coated material to a substrate. Open time refers to the maximum time that a remoistened adhesive can be held before applying and still produce a fiber tearing bond. Ideal remoistening adhesives have both a short bond time and a long open time.

Many previous attempts to increase the open time, while simultaneously decreasing the bond time, have been unsatisfactory, primarily because these two properties are closely related to the solubility of the adhesive film. It is generally found that by increasing the open time, the bond time also is increased and conversely, by decreasing the bond time the open time also is decreased. Heretofore, it has not been possible to produce a remoistening adhesive having an increase in open time while simultaneously maintaining or reducing the bond time.

It is an object of the present invention to increase the open time of a remoistening adhesive composition while simultaneously decreasing the bond time.

It is another object of the present invention to provide a process for preparing an adhesive formulation suitable for use as a remoistening adhesive having improved characteristics.

It is another object of the present invention to provide a remoistening adhesive composition having improved blocking characteristics.

Other objects of the present invention will be apparent from the following description.

The present invention provides a process for the preparation of an adhesive composition which comprises admixing ungelatinized, chemically modified starch, the starch being substantially free of set back after gelatinization in water, a glycol selected from the group consisting of propylene glycol and polyethylene glycol, having a molecular weight between about 200 and about 7,000, and water in proportions such that the ratio of starch to glycol exceeds about 2:1, and the resulting mixture contains between about 30% and about 70% solids, and heating the mixture to a temperature sufficient to substantially gelatinize the starch.

Further, the present invention provides a novel adhesive composition suitable for use as a remoistening adhesive, which comprises ungelatinized, chemically modified starch, the starch being substantially free of set back after gelatinization in water, a glycol selected from the group consisting of propylene glycol and polyethylene glycol having a molecular weight between about 200 and about 7,000, and water in proportions such that the ratio of starch to glycol exceeds about 2:1, the resulting mixture containing between about 30% and about 70% solids, said mixture having been heated to a temperature sufficient to substantially gelatinize the starch.

Furthermore, the present invention provides an adhesive composition which in addition to the starch, glycol, and water may optionally contain an adjunct and/or a plasticizer. The adjunct is selected from the group consisting of animal glue, dextrin, and a combination thereof. Suitable plasticizers include sorbitol, sodium nitrate, urea, and other known plasticizing agents. The plasticizer may be present in an amount up to about 15% by weight. The adjunct is present in an amount up to about 25% by weight of the adhesive composition, preferably less than about 10% by weight. The ratio of the starch and adjunct combined to the plasticizer and glycol combined exceeds about 2:1, preferably about 4:1, and may be as high as 15:1.

The present invention further provides a dry composition suitable for use in a remoistening adhesive composition which dry composition comprises an admixture of starch and a glycol selected from the group consisting of polyethylene glycol having a molecular weight of at least 200 and propylene glycol, in proportions such that the glycol is present in an amount between about 0.5 and about 15% by weight of the starch.

If the glycol is present in an amount between 3 and 15% by weight of the starch, it is advantageous to add a small quantity, about 0.1–2.0%, of a water insoluble mobilizing agent, such as tricalcium phosphate, to aid in retaining mobility of the starch.

The dry mix would ultimately be admixed with water and optionally, a plasticizer to obtain a remoistening adhesive composition.

The present invention is based upon the discovery that the open time is increased while the bond time simultaneously is decreased in a remoistening adhesive composition which contains an ungelatinized, chemically modified starch by adding a glycol component selected from the group consisting of propylene glycol and polyethylene glycol, having a molecular weight between about 200 and about 7,000, preferably between about 400 and about 6,000. It is not known with certainty why addition of either of these two glycols or a combination thereof provides an improved open time as well as an improved bond time. It has been found that while ethylene glycol may on occasion, show slight improvements in open time and bond time, its performance is inconsistent. Polypropylene glycol will not improve either open time or bond time, and, in fact, it may cause regression of both.

It has also been found advantageous to adjust the pH prior to gelatinizing the starch to between about 8 and about 12, preferably, about 10, to even further improve the bond time and the open time.

In a specific embodiment, acid-modified waxy milo starch in the amount of 70 parts by weight is admixed with 15 parts of dextrin, 6.5 parts of urea, 6.5 parts of sodium nitrate, 2 parts of propylene glycol, and 100 parts of water. The pH of the admixture is adjusted to 10. The mixture is then cooked at 195° F. for about 15 minutes. The cooked mixture is subsequently cooled at about 150° F. The adhesive mixture is ready for application to its substrate, i.e., paper, fabric or the like. Generally, in commercial operations, remoistening adhesive compositions are applied at a temperature of approximately 150° F. Optionally, the pH of the adhesive mixture of the present invention may be adjusted to a neutral pH or any pH desired after heating without loss of the improved characteristics.

Suitable starches for use in the present invention are ungelatinized, chemically modified starches that are substantially free of set back after gelatinization in water. Different types of starch are suitable for use in the present invention, for instance, cereal starches such as corn, grain sorghum, and wheat, waxy starches such as waxy milo and waxy maize, and root starches such as potato starch and tapioca starch. It is necessary for a starch from any of these three species to be chemically modified to substantially eliminate the set back properties of the starch. Without the proper modification, the starch component would gel or become viscous after gelatinization of the starch. This property of an unmodified starch is referred to in the art as "set back." Hence, it is necessary in the present invention to chemically modify the starch to achieve stability of the starch against set back. In other words, the starch component must remain in liquid form in the final adhesive composition prior to application to its substrate.

Cereal starch may be modified by derivatization to achieve stability against set back. Suitable starch derivatives include starch ethers and starch esters.

Waxy starch is preferably subjected to simple chemical modification such as acid modification, oxidation, enzyme modification or the like to render the starch suitable for use in the present invention.

Some of the root starches are rendered suitable for use in the present invention by chemical modification such as acid modification, oxidation or the like. Other root starches may require a degree of derivatization to be rendered suitable for use in the present invention.

The term "ungelatinized, chemically modified starch" as used herein, includes all of the starches and their modified forms discussed above as well as their equivalents.

Further modification of the ungelatinized, chemically modified starch defined above may be effected if desired without altering the acquired property of the starch to be stable against set back.

The components may be admixed in any sequence desired. The starch and water must be present before the cooking step and if a pH adjustment is desired it must be effected before the cooking step.

The adhesive composition, when ready for application, contains about 30% to about 70% solids by weight, preferably between about 40% to 60% solids by weight.

The solid components are present in a proportion such that the ratio of the starch component to the glycol, and if desired plasticizer combined, exceeds about 2:1, and preferably is in the range of between about 4:1 and about 15:1. Optionally, an adjunct selected from the group consisting of animal glue, dextrin, and a combination thereof, may be added in an amount such that the ratio of the starch component combined with the adjunct to the glycol exceeds about 2:1, and preferably is between about 4:1 and about 10:1.

The examples demonstrate the improved characteristics of the remoistening adhesive composition of the present invention when used to manufacture a gummed paper tape.

Definitions for the terms "bond time" and "open time" were presented above. The data for the bond time are obtained as follows: At least 5 strips of tape, 9 inches long, are cut from the first, middle, and last portions of the prepared tape. A strip is remoistened by means of a gummed tape dispenser generally used by a consumer. At the same time, a stop watch is activated. When 5 seconds have elapsed, the tape is laminated to the smooth side of a heavy caliper chipboard using uniform hand pressure. The tester then immediately begins delaminating the tape at a moderately slow rate pulling at a right angle to the surface. When 80–100% fiber tear occurs the stop watch is stopped. The total elapsed time, in seconds, is reported as the bond time. This represents the shortest time necessary for the tape to develop 80–100% fiber tear after an open time of 5 seconds. A short time represents a fast bond development. A series of at least 5 strips are run and the results averaged.

The data presented for the open time and stripping test are obtained as follows:

At least three sets of tap strips 9 inches long are cut from the first, middle, and last portions of the specified tape. Each set should contain 7 strips which will be used to evaluate open time and stripping qualities over a range of from 0–30 seconds. The tests are run in the following manner: Remoisten a strip of tape and immediately laminate to the double backer side of a corrugated board substrate with uniform hand pressure. Label the laminated tape "0 seconds delay." Remoisten the remaining strips in a like manner but delay 5, 10, 15, 20, 25 and 30 seconds, respectively, before laminating to the substrate. Label these strips to indicate the delay time. At least three complete sets of laminated tape representing from 0 to 30 seconds delay are prepared and allowed to dry for a minimum of two hours. The dried tape strips are carefully removed from the substrate using a peeling action and a spatula to remove any portions of the tape remaining. A percent of fiber tear is estimated visually at each delay time. Open time is reported as the longest delay time that will produce from 80–100% fiber tear and average of at least three tests is reported. Stripping qualities are reported as the percent of fiber tear divided by 10 at each delay time. The reported results are added to create a sum for each set run. A cumulative total of the stripping quality determinations is reported as the stripping index. The higher this number the better the stripping qualities.

Blocking is defined as that degree of cohesion or adhesion between contiguous layers of gummed papers which interferes with free removal of one sheet without disturbing the surface of another. For instance, a roll of gummed paper stored under relatively high humidity conditions may stick in such a manner that the gummed paper or tape is virtually unusable. Minimal blocking is important to an acceptable remoistening adhesive composition. The test procedure for obtaining the data on the blocking characteristics of the adhesive formulation is as follows: Eight specimens, 1 inch by 3 inches, for each sample are cut. One end of each strip is marked with a sample designation. The samples are fanned open, one from another, to permit open exposure. The exposed samples are left in open form for 6 hours in either 75% or 85% relative humidity at room temperature of about 73° F. After 6 hours the strips are stacked, one over the other, gummed side down, and in register. The stack is then placed on a glass plate in the same humidity chamber in which it was conditioned, with a 4 pound weight on the stack evenly distributed over a 2 inch by 1 inch area. The one inch section without weight should be the marked end, freely available at the end of the test to evaluate the degree of bonding in the area subjected to load. The stack is kept under a constant load of 2 p.s.i. at the preselected conditions of relatively humidity and temperature for 18 hours. After this time period, the weight is removed while the relative position of each strip in the stack is maintained. The stack is removed from the humidity chamber and conditioned for 4 hours at about 50% relatively humidity at room temperature. Then, one by one, each strip is removed and rated according to the following scale:

0—No blocking (strips separated easily)
1—Sticking, but no fiber tear
2—0–25% fiber tear
3—25–50% fiber tear
4—50–75% fiber tear
5—75–100% fiber tear Thus, the lower numbers of the rating scale indicate superior qualities of the adhesive formulation.

In the following operating examples, which clearly illustrate the invention, all percentages are by weight and all temperatures are in degrees Fahrenheit. All times, such as open time and bond time, are presented in seconds. The solids contents of each adhesive formulation, unless otherwise specified, is 50%.

The starches used in the examples have the following viscosity ranges:

Acid modified waxy milo, 75 gram Scott _____ 38–55
Acid modified waxy maize, 75 gram Scott _____ 35–45
Oxidized potato, 100 gram Scott _____ 30–50

EXAMPLE I

Formulations, designated below as A, B, C, and D were prepared. In each formulation the starch component was acid-modified waxy milo starch.

All of the constituents were admixed and the pH reading of the slurry taken. The pH was then adjusted in Formulations A and C to a pH of 10, in D to a pH of 12, but no adjustment was made in Formulation B. Subsequent cooking was at 195° F. for 15 minutes, and then the pH was again measured. The formulations were then cooled to 150° F. and tested. The test results are set forth in Table I.

| Formulation | A | B | C | D |
|---|---|---|---|---|
| Starch component, percent | 70 | 70 | 70 | 70 |
| Dextrin, percent | 15 | 15 | 15 | 15 |
| Urea, percent | 7.5 | 6.5 | 6.5 | 6.5 |
| Sodium nitrate, percent | 7.5 | 6.5 | 6.5 | 6.5 |
| Propylene glycol, percent | | 2 | 2 | 2 |

TABLE I

| | A | B | C | D |
|---|---|---|---|---|
| Slurry pH | 4.1 | 4.0 | 4.0 | 4.0 |
| pH adjusted to | 10.0 | | 10.0 | 12.0 |
| pH after heating | 8.8 | 7.9 | 8.8 | 10.8 |
| Bond time, seconds | 13 | 12 | 7 | 9 |
| Open time, seconds | 15 | 25 | 28 | 26 |
| Stripping quality after— | | | | |
| 0 sec. delay | 30 | 30 | 30 | 30 |
| 5 sec. delay | 30 | 30 | 30 | 30 |
| 10 sec. delay | 30 | 30 | 30 | 30 |
| 15 sec. delay | 29 | 30 | 30 | 30 |
| 20 sec. delay | 15 | 29 | 29 | 30 |
| 25 sec. delay | 12 | 27 | 29 | 29 |
| 30 sec. delay | 6 | 23 | 26 | 28 |
| Stripping index | 152 | 199 | 204 | 207 |
| Blocking 85% R.H. (relative humidity) | 3 | 1 | 1 | 1 |

It will be noted in Table I that in both Formulations B and C the bond time decreased and the open time increased because propylene glycol was added. Formulation C further demonstrates that the bond time and open time were improved over Formulation B by adjustment of the pH, prior to gelatinization of the starch, to approximately 10.

EXAMPLE II

Three formulations, designated below as E, F, and G were prepared. This example differs from Example I in that the starch component was acid-modified waxy maize starch.

The pH of the mixture was adjusted in Formulations D and F to about 10. The test results are set forth in Table II.

| Formulation | E | F | G |
|---|---|---|---|
| Starch component, percent | 70 | 70 | 70 |
| Dextrin, percent | 15 | 15 | 15 |
| Urea, percent | 7.5 | 6.5 | 6.5 |
| Sodium nitrate, percent | 7.5 | 6.5 | 6.5 |
| Propylene glycol, percent | | 2 | 2 |

TABLE II

| | E | F | G |
|---|---|---|---|
| Slurry pH | 4.5 | 4.5 | 4.5 |
| pH adjusted to | 10.0 | | 10.0 |
| pH after heating | 8.9 | 7.9 | 8.8 |
| Bond time, seconds | 14 | 12 | 10 |
| Open time, seconds | 17 | 18 | 23 |

As in Example I, improved open time and bond time are obtained by the addition of the glycol. It is further observed that additional improvement is obtained when the pH is adjusted prior to gelatinization of the starch.

EXAMPLE III

Three formulations, designated below as H, J, and K were prepared in accordance with Example I except that in each formulation the starch component was oxidized potato starch. All results are set forth in Table III.

| Formulation | H | J | K |
|---|---|---|---|
| Starch component, percent | 85 | 85 | 85 |
| Urea, percent | 7.5 | 6.5 | 6.5 |
| Sodium nitrate, percent | 7.5 | 6.5 | 6.5 |
| Propylene glycol, percent | | 2 | 2 |

TABLE III

| | H | J | K |
|---|---|---|---|
| Slurry pH | 4.8 | 4.8 | 4.8 |
| pH adjusted to | 10.0 | | 10.0 |
| pH after heating | 8.5 | 7.0 | 8.4 |
| Bond time, seconds | 19 | 17 | 14 |
| Open time, seconds | 17 | 22 | 25 |
| Stripping quality after— | | | |
| 0 sec. delay | 30 | 30 | 30 |
| 5 sec. delay | 30 | 30 | 30 |
| 10 sec. delay | 30 | 30 | 30 |
| 15 sec. delay | 28 | 29 | 30 |
| 20 sec. delay | 25 | 27 | 29 |
| 25 sec. delay | 24 | 25 | 27 |
| 30 sec. delay | 18 | 21 | 25 |
| Stripping index | 185 | 192 | 201 |

As in Examples I and II an improvement in both open time and bond time is noted with an adhesive formulation using oxidized potato starch as the starch component and with the addition of propylene glycol. As before even greater improvement is observed when the pH of the mixture is adjusted to about 10, prior to gelatinization of the starch.

EXAMPLE IV

Several formulations were prepared demonstrating the application of polyethylene glycol as an additive in the remoistening adhesive composition of the present invention. Table IV sets forth comparative data obtained when applying adhesive compositions containing polyethylene glycol having molecular weights in the range of 100 to 7,000.

In each of the formulations below, the starch component was acid-modified waxy milo starch. There were 70 parts by weight of the starch component, 15 parts by weight of dextrin, 6.5 parts by weight of urea, 6.5 parts by weight of sodium nitrate, and 2 parts by weight of the additive designated in Table IV, and 100 parts by weight of water.

All components were slurried in water and the pH adjusted to 10.0. The compositions were then cooked at a temperature of 195° F. for 15 minutes. The pH after heating in each instance was 8.8. The formulations were then cooled to 150° F. whereupon they were applied for testing and the test results obtained are set forth in Table IV.

The control sample is the same as sample A of Example I.

TABLE IV

| | | | | | | | | | | Control Sample |
|---|---|---|---|---|---|---|---|---|---|---|
| Polyethylene glycol: | | | | | | | | | | |
| Molecular weight | 7,000 | 6,000 | 3,300 | 1,450 | 1,000 | 600 | 550 | 400 | 200 | |
| Bond time, seconds | 9 | 8 | 8 | 8 | 7 | 8 | 8 | 8 | 9 | 13 |
| Open time, seconds | 18 | 20 | 25 | 25 | 28 | 23 | 22 | 20 | 20 | 15 |
| Stripping quality after— | | | | | | | | | | |
| 0 sec. delay | 30 | 30 | 30 | 30 | 30 | 30 | 30 | 30 | 30 | 30 |
| 5 sec. delay | 30 | 30 | 30 | 30 | 30 | 30 | 30 | 30 | 30 | 30 |
| 10 sec. delay | 30 | 30 | 30 | 30 | 30 | 30 | 30 | 30 | 30 | 30 |
| 15 sec. delay | 30 | 30 | 30 | 30 | 30 | 30 | 30 | 30 | 30 | 29 |
| 20 sec. delay | 26 | 27 | 29 | 30 | 30 | 28 | 27 | 28 | 27 | 15 |
| 25 sec. delay | 23 | 25 | 26 | 26 | 27 | 26 | 25 | 24 | 22 | 12 |
| 30 sec. delay | 19 | 21 | 25 | 25 | 26 | 24 | 23 | 22 | 16 | 6 |
| Stripping index | 188 | 193 | 200 | 201 | 203 | 198 | 195 | 194 | 185 | 152 |
| Blocking at 85% R.H. | 1 | 1 | 1 | 1 | 1 | 1 | 1 | 1 | 2 | 3 |

It may be noted from Table IV that open times and bond times superior to the control sample are obtained in the adhesive formulations containing polyethylene glycol having a molecular weight from 200 to 7,000. The data also show that the best results are obtained using a polyethylene glycol having a molecular weight of about 1,000.

EXAMPLE V

An adhesive mixture was prepared in which the propylene glycol content was varied from 0 to 15%. In each case, the starch component was acid-modified waxy milo starch. All of the constituents were admixed and the pH reading of the slurry taken. The mixture was then cooked at 195° F. for 15 minutes and the pH again measured. The composition was then cooled to 150° F. and tested as before. All results are set forth in Table V.

TABLE V

| | | | | | | |
|---|---|---|---|---|---|---|
| Starch component, percent | 70 | 70 | 70 | 70 | 70 | 70 |
| Dextrin, percent | 15 | 15 | 15 | 15 | 15 | 15 |
| Urea, percent | 7.5 | 7.0 | 6.5 | 5.5 | 3.5 | 0 |
| Sodium nitrate, percent | 7.5 | 7.0 | 6.5 | 5.5 | 3.5 | 0 |
| Propylene glycol, percent | 0 | 1 | 2 | 4 | 8 | 15 |
| Slurry pH | 4.1 | 4.1 | 4.1 | 4.1 | 4.1 | 3.8 |
| Cooked pH | 7.2 | 7.2 | 7.2 | 7.3 | 7.3 | 4.1 |
| Brookfield viscosity, cps. at 20 r.p.m. (150° F.) | 700 | 710 | 680 | 700 | 690 | 680 |
| Bond time, seconds | 38 | 30 | 27 | 24 | 21 | 19 |
| Open time, seconds | 20 | 25 | 28 | 30 | 30 | 30 |
| Stripping quality | | | | | | |
| 0 sec. delay | 30 | 30 | 30 | 30 | 30 | 30 |
| 5 sec. delay | 30 | 30 | 30 | 30 | 30 | 30 |
| 10 sec. delay | 30 | 30 | 30 | 30 | 30 | 30 |
| 15 sec. delay | 30 | 30 | 30 | 30 | 30 | 30 |
| 20 sec. delay | 25 | 29 | 29 | 30 | 30 | 30 |
| 25 sec. delay | 20 | 26 | 28 | 29 | 30 | 30 |
| 30 sec. delay | 18 | 19 | 23 | 29 | 30 | 30 |
| Index | 183 | 194 | 200 | 208 | 210 | 210 |

As may be seen from the results above, decided improvement is obtained in an adhesive composition in which propylene glycol is added and in which is replaces part or all of the plasticizer.

EXAMPLE VI

Adhesive formulations were prepared having either 70% or 30% solids and propylene glycol was added. Table VI shows the results with and without the addition of propylene glycol. The formulations using the same constituents were prepared in the same manner as before.

TABLE VI

| | | | | |
|---|---|---|---|---|
| Starch component, percent | 70 | 70 | 70 | 70 |
| Dextrin, percent | 15 | 15 | 15 | 15 |
| Urea, percent | 7.5 | 6.5 | 7.5 | 6.5 |
| Sodium nitrate, percent | 7.5 | 6.5 | 7.5 | 6.5 |
| Propylene glycol, percent | 0 | 2 | 0 | 2 |
| Percent solids | 70 | 70 | 30 | 30 |
| Slurry pH | 4.1 | 4.1 | 4.1 | 4.1 |
| Cooked pH | 7.2 | 7.2 | 6.9 | 6.9 |
| Brookfield viscosity, cps. at 20 r.p.m., 150° F. | 18,000 | 17,500 | 20 | 20 |
| Bond time, seconds | 44 | 39 | 41 | 34 |
| Open time, seconds | 10 | 15 | 8 | 10 |
| Stripping quality after— | | | | |
| 0 sec. delay | 30 | 30 | 28 | 28 |
| 5 sec. delay | 30 | 28 | 24 | 26 |
| 10 sec. delay | 29 | 25 | 20 | 22 |
| 15 sec. delay | 23 | 20 | 15 | 18 |
| 20 sec. delay | 10 | 12 | 2 | 4 |
| 25 sec. delay | 4 | 8 | 0 | 1 |
| 30 sec. delay | 1 | 5 | 0 | 0 |
| Index | 127 | 128 | 89 | 98 |
| Blocking, 85% R.H. | 0 | 0 | 0 | 0 |

This example demonstrates the improvement by the addition of propylene glycol regardless of solids content.

EXAMPLE VII

An adhesive formulation was prepared in which no dextrin or animal glue was present. The constituents were as follows: acid-modified waxy milo starch, 85%; urea, 7.5%; sodium nitrate, 7.5%; propylene glycol, 0. In another formulation the same amount of starch was used. Urea and sodium nitrate were each diminished by the amount of 1%, and 2% propylene glycol was added. The results are set forth in Table VII below.

TABLE VII

| | | |
|---|---|---|
| Starch component, percent | 85 | 85 |
| Urea, percent | 7.5 | 6.5 |
| Sodium nitrate, percent | 7.5 | 6.5 |
| Propylene glycol, percent | 0 | 2 |
| Slurry pH | 4.8 | 4.8 |
| Cooked pH | 7.8 | 7.8 |
| Brookfield viscosity, cps. at 20 r.p.m. 150° F. | 1,200 | 1,190 |
| Bond time, seconds | 19 | 14 |
| Open time, seconds | 20 | 25 |
| Stripping quality after— | | |
| 0 sec. delay | 30 | 30 |
| 5 sec. delay | 30 | 30 |
| 10 sec. delay | 30 | 30 |
| 15 sec. delay | 29 | 30 |
| 20 sec. delay | 25 | 28 |
| 25 sec. delay | 21 | 25 |
| 30 sec. delay | 18 | 20 |
| Index | 183 | 193 |
| Blocking, 85% R.H. | 0 | 0 |

This example illustrates the effectiveness of the addition of propylene glycol in a remoistening adhesive composition wherein starch is the only carbohydrate component.

EXAMPLE VIII

The starch component in this example consisted of a hydroxyethyl ether derivative of red milo starch having a 100 gram Scott viscosity of approximately 45 seconds and a degree of substitution of 0.05 to 0.07. Table VIII below illustrates the improvement obtained by adding propylene glycol to the remoistening adhesive composition containing the starch derivative.

TABLE VIII

| | | |
|---|---|---|
| Starch component, percent | 85 | 85 |
| Urea, percent | 7.5 | 6.5 |
| Sodium nitrate, percent | 7.5 | 6.5 |
| Propylene glycol, percent | 0 | 2 |
| Slurry pH | 5.2 | 5.2 |
| Cooked pH | 6.9 | 6.9 |
| Brookfield viscosity, cps. at 20 r.p.m., 150° F | 7,000 | 7,050 |
| Bond time, seconds | 17 | 13 |
| Open time, seconds | 25 | 27 |
| Stripping quality after — | | |
| 0 sec. delay | 30 | 30 |
| 5 sec. delay | 30 | 30 |
| 10 sec. delay | 30 | 30 |
| 15 sec. delay | 30 | 30 |
| 20 sec. delay | 29 | 30 |
| 25 sec. delay | 25 | 28 |
| 30 sec. delay | 19 | 21 |
| Index | 193 | 199 |
| Blocking, 85% R.H | 0 | 0 |

EXAMPLE IX

This example illustrates the feasibility of using all one plasticizer while obtaining improvement in the adhesive by the addition of a portion of a glycol constituent. The starch is acid-modified waxy milo starch. The test results are in Table IX below:

TABLE IX

| | | | | |
|---|---|---|---|---|
| Starch component, percent | 70 | 70 | 70 | 70 |
| Dextrin, percent | 15 | 15 | 15 | 15 |
| Urea, percent | 15 | 13 | | |
| Sodium nitrate, percent | | | 15 | 13 |
| Propylene glycol, percent | | 2 | | 2 |
| Slurry pH | 5.0 | 4.9 | 4.1 | 4.1 |
| pH adjusted to | 10.0 | 10.0 | 10.0 | 10.0 |
| pH after heating | 8.7 | 8.7 | 8.7 | 8.7 |
| Bond time, seconds | 10 | 7 | 11 | 7 |
| Open time, seconds | 13 | 18 | 14 | 20 |

EXAMPLE X

This example compares previous additives considered by the prior art to be of benefit to a remoistening adhesive composition. It may plainly be seen from Table X that polyethylene glycol or propylene glycol are much more effective as additives in a remoistening adhesive composition. In each case below, the formulations were as follows: acid-modified waxy milo starch, 70%; dextrin, 15%; urea, 6.5%; sodium nitrate, 6.5%; additive, 2%.

In the control sample, no additive was used and the urea was in the amount of 7.5% and the sodium nitrate was present in the amount of 7.5%.

TABLE X

| | Control | Ethylene Glycol | Glycerin | Propylene Glycol | Polyethylene Glycol, Mol wt. 1,000 |
|---|---|---|---|---|---|
| Slurry pH | 4.1 | 4.1 | 4.1 | 4.1 | 4.1 |
| Adjusted pH | 10.0 | 10.0 | 10.0 | 10.0 | 10.0 |
| pH after heating | 8.8 | 8.8 | 8.8 | 8.8 | 8.8 |
| Bond time, seconds | 13 | 12 | 8 | 7 | 7 |
| Open time, seconds | 15 | 15 | 17 | 28 | 28 |
| Stripping quality after— | | | | | |
| 0 sec. delay | 30 | 30 | 30 | 30 | 30 |
| 5 sec. delay | 30 | 29 | 30 | 30 | 30 |
| 10 sec. delay | 30 | 27 | 30 | 30 | 30 |
| 15 sec. delay | 29 | 25 | 28 | 30 | 30 |
| 20 sec. delay | 15 | 19 | 25 | 29 | 30 |
| 25 sec. delay | 12 | 14 | 14 | 29 | 27 |
| 30 sec. delay | 6 | 5 | 8 | 26 | 26 |
| Index | 152 | 149 | 165 | 204 | 203 |
| Blocking, at 85% R.H | 3 | 2 | 3 | 1 | 1 |

It will be noted from the results above that polyethylene glycol and propylene glycol enhance all the desirable properties of the remoistening adhesive.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

I claim:
1. A process for the preparation of an adhesive composition which comprises: admixing ungelatinized, chemically modified starch, said starch being substantially free of set back after gelatinization in water, a plasticizer, a glycol selected from the group consisting of propylene glycol and polyethylene glycol, and water in proportions such that the ratio of starch to plasticizer and glycol combined exceeds about 2:1, and the resulting mixture contains between about 30% and about 70% solids by weight; and heating the mixture to a temperature sufficient to substantially gelatinize the starch.

2. A process in accordance with claim 1 including the additional step, following mixing and preceding heating, of adjusting the pH to a pH between about 8 and about 12.

3. A process in accordance with claim 1 wherein the amount of the glycol in the mixture is in the range from about 1% to about 15% by weight.

4. A process in accordance with claim 1 wherein the starch is acid-modified waxy milo starch, the glycol is polyethylene glycol having a molecular weight between about 200 and about 6,000 and is present in an amount between about 1% and about 15% by weight including the additional step following mixing and preceding heating of adjusting the pH to about 10.

5. A process for the preparation of an adhesive composition which comprises:
   admixing ungelatinized, chemically modified starch, said starch being substantially free of set back after gelatinization in water, a plasticizer, a glycol in an amount between about 1% and about 15% by weight selected from the group consisting of propylene glycol and polyethylene glycol having a molecular weight between about 200 and about 6,000, and water in proportions such that the ratio of starch to plasticizer and glycol combined exceeds about 4:1, and the resulting mixture contains between about 40% and about 60% solids by weight;
   adjusting the pH of the resulting mixture to a pH of at least about 10; and
   heating the mixture to a temperature sufficient to substantially gelatinize the starch.

6. A process in accordance with claim 1 wherein a portion of the starch component is replaced with an adjunct selected from the group consisting of animal glue, dextrin, and a combination thereof, and wherein the ratio of starch and adjunct combined, a plasticizer and glycol combined, exceeds about 2:1.

7. A process for the preparation of an adhesive composition which comprises: admixing acid-modified waxy milo starch, urea, sodium nitrate, dextrin, propylene glycol, and water, in proportions such that the ratio of starch and dextrin combined to urea, sodium nitrate, and propylene glycol combined is at least about 2:1, and the resulting mixture contains between about 30% and about 70% solids by weight; adjusting the pH of the mixture to a pH of at least about 8; and heating the mixture to a temperature sufficient to substantially gelatinize the starch.

8. An adhesive composition suitable for use as a re-moistening adhesive upon heating to gelatinize the starch component thereof, comprising ungelatinized chemically modified starch, said starch being substantially free of set back after gelatinization in water, a plasticizer, a glycol selected from the group consisting of propylene glycol and polyethylene glycol, having a molecular weight between about 200 and about 6,000 and water in proportions such that the ratio of starch to plasticizer and glycol combined exceeds about 2:1, and the composition contains between about 30% and about 70% solids by weight.

9. A composition in accordance with claim 8 wherein said glycol is present in an amount between about 1% and about 15%.

10. A composition in accordance with claim 8 wherein said composition has a pH of at least about 10.

11. An adhesive composition suitable for use as a re-moistening adhesive upon heating to gelatinize the starch component thereof, comprising acid-modified waxy milo starch, a plasticizer, a glycol selected from the group consisting of propylene glycol and polyethylene glycol having a molecular weight between about 200 and about 6,000, and water in proportions such that the ratio of starch to plasticizer and glycol combined exceeds about 4:1, and the composition contains between about 40% and about 60% solids by weight, said composition having a pH of at least about 10.

12. An adhesive composition suitable for use as a re-moistening adhesive upon heating to gelatinize the starch component thereof, comprising in the form of a mixture in an aqueous vehicle, wherein the non-aqueous components comprise acid-modified waxy milo starch in the amount of about 70% by weight, about 6.5% sodium nitrate, about 6.5% urea, about 15% dextrin, and about 2% propylene glycol, and wherein the aqueous vehicle comprises sufficient water such that the solids content by weight of the mixture is about 50%, said mixture having a pH of at least about 10.

13. A composition suitable for use in an adhesive formulation comprising a mixture of ungelatinized, chemically modified starch, the starch being substantially free of set back after gelatinization in water, and a glycol selected from the group consisting of propylene glycol and polyethylene glycol having a molecular weight between about 200 and about 6,000 in proportions such that the glycol is present in an amount between about 0.5% and about 15% by weight of the starch.

14. A composition suitable for use in an adhesive composition comprising a substantially homogeneous mixture of an ungelatinized, chemically modified starch, the starch being substantially free of set back after gelatinization in water, a glycol selected from the group consisting of propylene glycol and polyethylene glycol having a molecular weight of at least about 200, in proportions such that the glycol is present in an amount between about 0.5% and about 15% by weight of the starch, and tricalcium phosphate in an amount between about 0.1% and about 2.0% by weight based on the starch.

15. A process for the preparation of an adhesive composition which comprises: admixing ungelatinized, chemically modified starch, said starch being substantially free of set back after gelatinization in water, a glycol selected from the group consisting of propylene glycol and polyethylene glycol having a molecular weight between about 200 and about 6,000, and water in proportions such that the ratio of starch to glycol is at least about 4:1 and the resulting mixture contains between about 30% and about 70% solids, and heating the mixture to a temperature sufficient to substantially gelatinize the starch.

References Cited
UNITED STATES PATENTS

| | | | |
|---|---|---|---|
| 2,188,329 | 1/1940 | Bauer et al. | 91—68 |
| 2,883,300 | 4/1959 | Rickert | 106—213 |
| 3,351,480 | 11/1967 | Mentzer | 166—210 |

JAMES A. SEIDLECK, *Primary Examiner.*

A. H. BRODMERKEL, *Examiner.*

T. MORRIS, *Assistant Examiner.*